Figure 1A:
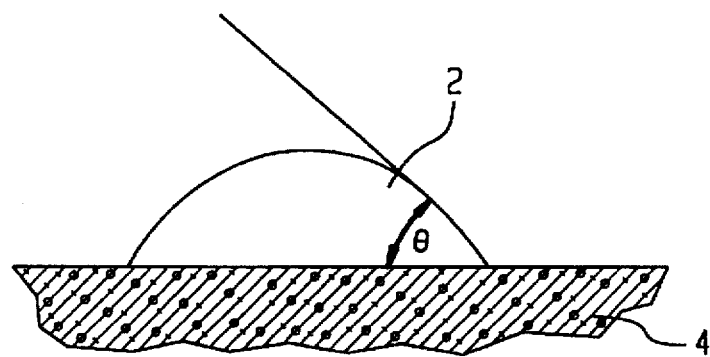

United States Patent [19]
Hsu et al.

[11] Patent Number: 5,718,943
[45] Date of Patent: Feb. 17, 1998

[54] METHOD FOR PRODUCING EFFLORESCENCE RESISTANT COATING ON CEMENTITIOUS SUBSTRATE

[75] Inventors: Oscar Hsien-Hsiang Hsu, Lansdale; Richard Barry Matt, Quakertown, both of Pa.

[73] Assignee: Rohm and Haas Company, Philadelphia, Pa.

[21] Appl. No.: 674,521

[22] Filed: Jul. 2, 1996

Related U.S. Application Data

[60] Provisional application No. 60/001,255, Jul. 20, 1995.
[51] Int. Cl.$^6$ .................. B05D 3/10; B05D 7/00; B05D 1/36
[52] U.S. Cl. .................. 427/136; 427/373; 427/393.6
[58] Field of Search .................. 427/136, 403, 427/373, 393.6, 299

[56] References Cited

U.S. PATENT DOCUMENTS

| | | | |
|---|---|---|---|
| 3,607,341 | 9/1971 | Goins et al. | 427/373 |
| 3,679,462 | 7/1972 | Pistilli et al. | 427/136 |
| 4,141,737 | 2/1979 | Moon et al. | 427/136 |
| 4,247,581 | 1/1981 | Cobb, Jr. et al. | 427/373 |
| 4,299,503 | 11/1981 | Day | 427/393.5 |
| 4,478,736 | 10/1984 | Raba, Jr. et al. | 252/180 |
| 4,795,590 | 1/1989 | Kent et al. | 252/307 |
| 4,839,222 | 6/1989 | Jain | 428/290 |
| 5,110,839 | 5/1992 | Chao | 521/83 |
| 5,215,827 | 6/1993 | Dotzauer et al. | 428/500 |
| 5,534,292 | 7/1996 | Mitsuo | 427/228 |
| 5,538,760 | 7/1996 | Sharma | 427/393.6 |
| 5,599,586 | 2/1997 | Israel | 427/393.6 |
| 5,635,248 | 6/1997 | Hsu et al. | 427/397 |
| 5,637,236 | 6/1997 | Lowe | 427/393.6 |

FOREIGN PATENT DOCUMENTS

| | | |
|---|---|---|
| 492210 | 9/1994 | European Pat. Off. . |
| 0 658 407 A2 | 6/1995 | European Pat. Off. . |
| 5036251 | 11/1975 | Japan ............... 427/136 |
| 0098504 | 7/1980 | Japan ............... 427/136 |
| 0205382 | 12/1982 | Japan ............... 427/136 |
| 1073271 | 6/1967 | United Kingdom . |

OTHER PUBLICATIONS

Carl L. Black, et al., "Efflorescence", CSI Monograph Series, 04M501, Feb. 1987.
Translation of European Patent Application EP 0 355 028 A1, Feb., 1990.

*Primary Examiner*—Diana Dudash
*Attorney, Agent, or Firm*—Sudhir G. Deshmukh

[57] ABSTRACT

The present invention is directed to producing an efflorescence resistant sealer coating on a cementitious substrate, such as, a roof tile. A foamed layer of an efflorescence resistant coating composition is preferably applied on the surface of a wet cementitious substrate. The wet cementitious substrate is then hydrated to produce the cementitious substrate having the efflorescence resistant coating thereon. If desired, the efflorescence resistant coating composition is provided with a pigment to produce a pigmented efflorescence resistant coating on the cementitious substrate or a clear efflorescence resistant coating of the present invention may be applied over pigmented cementitious substrate. The efflorescence resistant coating produced in accordance with the process of the present invention substantially reduces the formation of esthetically unpleasant efflorescent layer on cementitious substrate surfaces.

22 Claims, 4 Drawing Sheets

METHOD FOR PRODUCING EFFLORESCENCE RESISTANT COATING ON CEMENTITIOUS SUBSTRATE

This invention generally relates to a method of producing sealer coatings on substrates and more particularly to producing efflorescence resistant sealer coatings on cementitious substrates.

Cementitious substrate (CS) means, a substrate, such as, a roof tile, floor tile, wall tile, wall panel, roof shingle, roof slate, patio floor, drive way, concrete road, produced from a hydraulic substance. The term "hydraulic substance" means a substance having the ability on hydration to form with water, relatively insoluble bonded and hardened aggregations of considerable strength and dimensional stability. Such substances include Portland cement; aluminum cement; air-entraining cement; blended cement, such as, that typically blended with silica fibers, polymer fibers, or a mixture thereof; pozzolan cement; and trief cement, such as, that produced with wet slurry of finely ground slag. CS, preferably a concrete substrate is typically produced by mixing the hydraulic substance, such as, Portland cement, and water with desired amounts of fillers for modifying the structural properties of the resulting substrate. The water/cement mixture may further include from 1 to 20 percent by weight based on the weight of cement of conventional latex polymers added either in the wet state or dry state. Some exemplary fillers added to the water/cement mixture include, wood chips or wood fibers, silica, mineral and glass fibers, expanded shale or other light weight aggregates, synthetic fibers, such as Nylon fibers, or glass and mineral wool, reinforcing materials, such as, gravel, sand, metal or polymer reinforcing structures.

One of the problems associated with CS, especially pigmented CS, is the formation of an efflorescent layer on the surface of CS. The term "efflorescent layer" means a whitish coat formed on the CS surface during the hardening step of CS or upon exposure of CS to weathering. Such a coating is found to be esthetically not pleasing. It is believed, without reliance thereon, that the phenomenon of efflorescence results from the migration of efflorescence forming materials, such as, calcium ions, from within CS to the CS surfaces during the hardening step or as a result of weathering of CS. As the water associated with cement constituents, such as, calcium ions, evaporates from the CS surface, the cement constituents tend to migrate and deposit, as salts, on the CS surface and thereby producing the efflorescent layer on the CS surface. Some of these salts also react with atmospheric carbon dioxide to form insoluble whitish salts, such as, for example, calcium carbonate, to form the efflorescent layer.

Several attempts have been made to reduce the formation of the efflorescent layer on CS. For example, EP Application 0 355 028 A1 discloses spraying the CS surface with an acrylic polymer coating while CS is still in the wet state. The coated surface of the CS is irradiated with ultraviolet light during or after the drying of the CS. One of the problems associated with such a method is that the acrylic polymer coating tends to seep through the CS surface, which is generally highly porous, thereby favoring the cement constituents to migrate to surface and form an efflorescent layer. The present invention solves this problem by providing the CS surface, with a sealer coating that does not seep through the porous CS surface but stays on top of it, thereby substantially preventing the evaporation of moisture from the CS surface. As a result, the cement constituents do not substantially migrate to surface and form the efflorescent layer on the CS surface.

The present invention is directed to a method of producing an efflorescence resistant coating on a cementitious substrate comprising:

foaming an efflorescence resistant coating composition comprising an aqueous evaporable carrier containing a latex binder having a Tg in range varying from −20° C. to 100° C., a weight average molecular weight in the range varying from 500 to 5,000,000, and a foaming agent;

applying a foamed layer of said efflorescence resistant coating composition on the surface of said cementitious substrate;

collapsing said foamed layer on said surface of said cementitious substrate to form said efflorescence resistant coating thereon.

The present invention is further directed to a method of producing an efflorescence resistant coating on a cementitious substrate comprising:

foaming an efflorescence resistant coating composition comprising an aqueous evaporable carrier containing a latex binder having a Tg in range varying from −20° C. to 100° C., a weight average molecular weight in the range varying from 500 to 5,000,000; a foaming agent; a coalescent; and a wetting agent;

applying a foamed layer of said efflorescence resistant coating composition on the surface of a wet cementitious substrate;

wetting said surface of said wet cementitious substrate to uniformly distribute said foamed layer thereon;

collapsing said foamed layer on said surface of said wet cementitious substrate; and hydrating said wet cementitious substrate having said efflorescence resistant coating thereon.

Another problem associated with spray applied coatings, such as, those described in the EP Application 0 355 028 A1, is the physical disturbance imparted to a wet CS surface during the spraying of acrylic polymer coating. It is believed that the turbulence created on the wet CS surface by the disruptive action of the spray also plays a role in the migration of the cement constituents to the wet CS surface, which thereby results in the formation of the efflorescent layer thereon. The present invention solves this problem by applying a sealer coating that is substantially less disturbing to the wet CS surface than a typical spray applied coating.

Furthermore, the physical disturbance imparted to a slurried CS surface during the spraying of acrylic polymer coating thereon results in a surface with a rough or cratered texture. Such a surface tends to collect dirt, thereby promoting mildew growth, which results in CS having objectionable visual appearance. The coating produced by the method of the present invention reduces this problem by producing a smooth sealer coating on which substantially minimal mildew growth can occur. The method of the present invention applies a smooth sealer coating of the present invention over a smooth CS surface without disturbing such a smooth CS surface.

Yet another problem associated with spray applied coating is that it is difficult to control the thickness of a spray applied coating. The method of the present invention makes it is easier to control the thickness of the sealer coating during its application to the CS surface.

One of the advantages of the method of the present invention is that it results, if desired, in a coating having higher gloss than that produced by conventional spray applied coatings.

The following is a brief description of drawings:

FIGS. 1-A, 1-B and 1-C are illustrative views of foamed layers resting on a CS surface, where each Figure represents a foamed layer having different degrees of wetting as represented by contact angles.

Figure 2A:
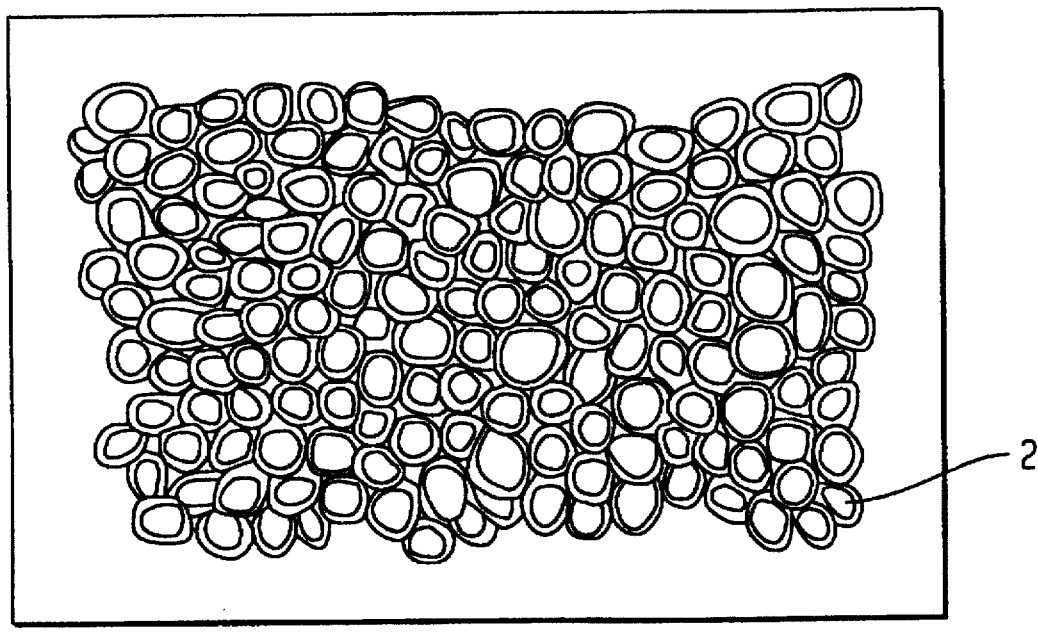
Figure 2B:
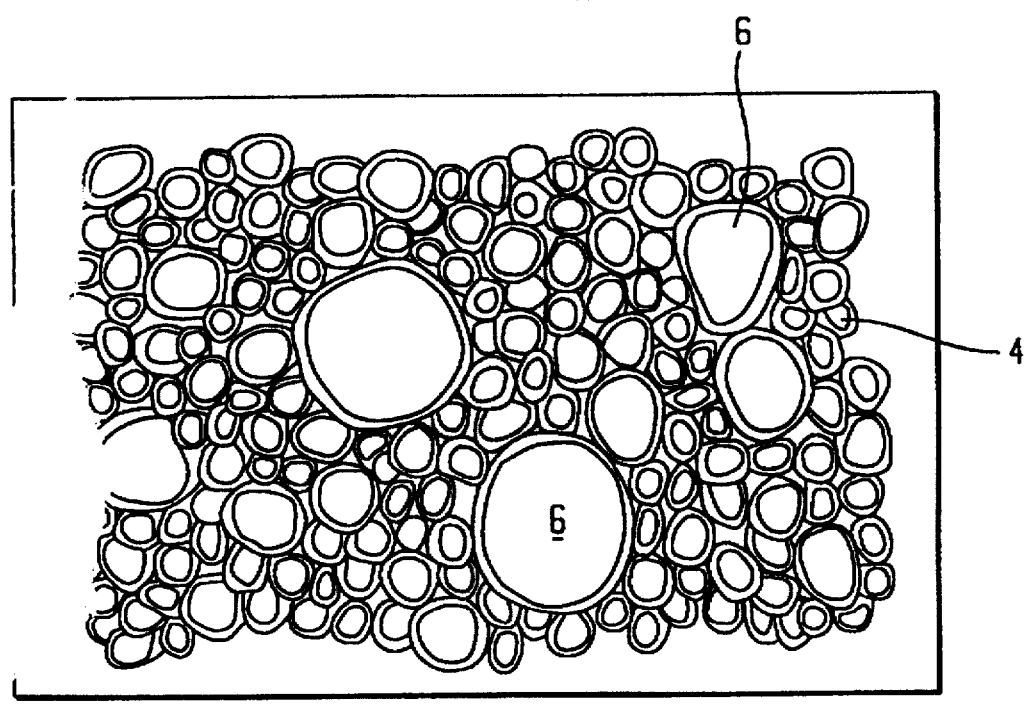

FIG. 2-A is a representation of a foamed layer having uniform cell size.

FIG. 2-B is a representation of a foamed layer having non-uniform cell size.

Figure 3A:
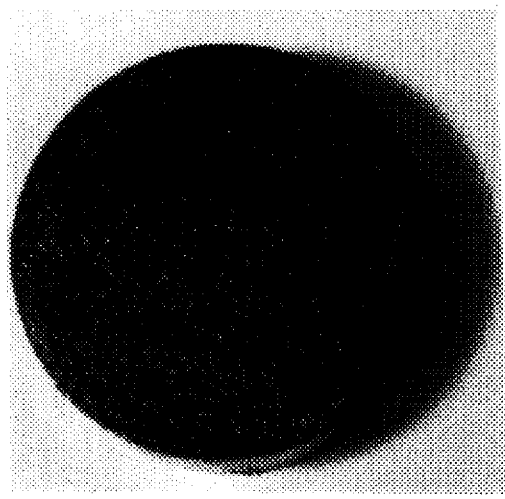
Figure 3B:
Figure 3C:
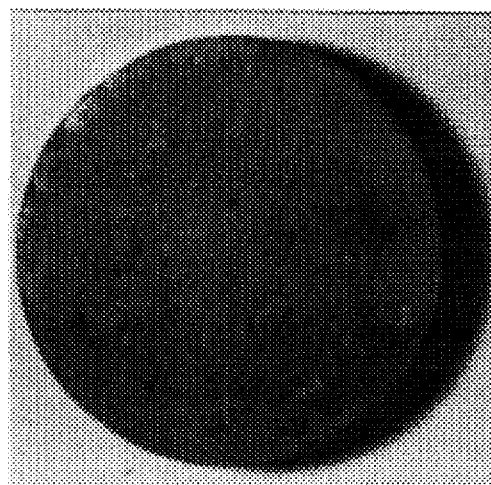

FIGS. 3-A, 3-B and 3-C exemplify various degrees of efflorescence observed on a concrete mix test substrate.

Figure 4A:
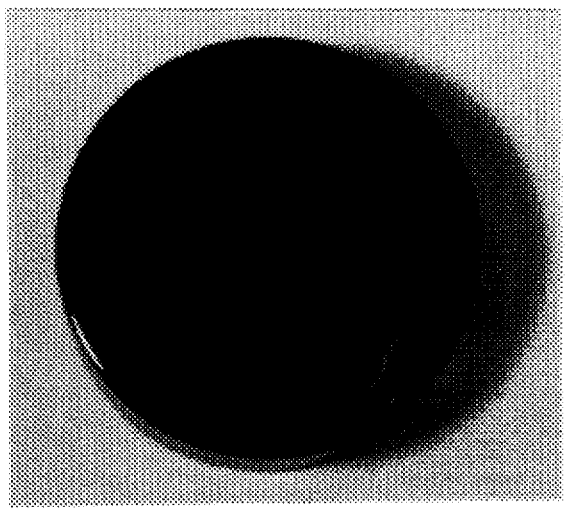
Figure 4B:
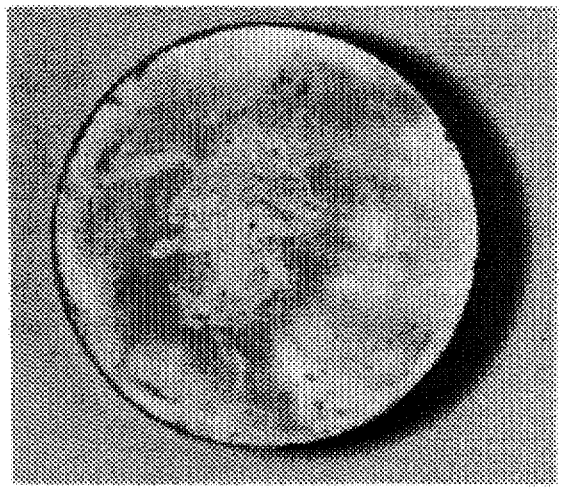
Figure 4C:

FIGS. 4-A, 4-B and 4-C exemplify various degrees of efflorescence observed on a slurried test substrate.

As used herein:

"Portland cement" means a fine gray powder typically made by heating, at 1350° C. to 1800° C., a calcareous material (limestone, marl or chalk) with an argillaceous material (clay or shale, $Al_2O_3 \cdot SiO_2$) to vitrification. The resulting clinker is typically mixed and ground with gypsum, typically 2 percent by weight cement.

"Hydration" means formation of a compound by the combining of water with some other substance, such as, hydraulic cement.

"Wet state" means the state of CS before hydration and before substantial evaporation of water has occurred from CS. This state for concrete roof tile, by way of example, may last for up to two hours following extrusion of the concrete roof tile. If desired the duration of wet state may be shortened or lengthened by heating or cooling, respectively or by maintaining CS in low or high humidity conditions, respectively.

"Green state" means the state of CS before its full hydration and before it reaches full structural strength but after substantial evaporation of water has occurred from CS. This state may last for up to several days. If desired, the duration of green state may be shortened or lengthened by heating or maintaining CS in low or high humidity conditions, respectively.

"Slurry" means a fluid concrete mix having high water content, which by way of example, may vary from 20 to 50 percent water based on the weight of the cement. In addition to cement, the slurry may contain additives, such as, sand and various iron oxide compounds for imparting desired color to the resulting CS.

"Concrete substrate", means a substrate typically produced by mixing 1 part of Portland cement with 0 to 6 parts of sand, 0 to 4 parts of gravel, all by volume. Water is added to this cement mixture to achieve desired fluidity, such as, for example, 50 liters of water per 100 kilograms of cement is added to the cement mixture, which is then molded, compacted or formed into desired shape and then hardened by hydration to form CS, such as, a roof tile.

"Add-on" means grams of the solid portion of a latex binder (dry portion) coated over a meter square area of the surface of the substrate.

"GPC weight average molecular weight" means the weight average molecular weight determined by gel permeation chromatography (GPC) which is described on page 4, Chapter I of The Characterization of Polymers published by Rohm and Haas Company, Philadelphia, Pa. in 1976, utilizing polymethyl methacrylate as the standard.

"Glass transition temperature (Tg)" is a narrow range of temperature, as measured by conventional differential scanning calorimetry (DSC), during which amorphous polymers change from relatively hard brittle glasses to relatively soft viscous rubbers. To measure the Tg by this method, the copolymer samples were dried, preheated to 120° C., rapidly cooled to −100° C., and then heated to 150° C. at a rate of 20° C./minute while data was being collected. The Tg was measured at the midpoint of the inflection using the half-height method.

"Latex binder" means "Dispersed polymer", "Solubilized polymer" (both defined below), or a mixture thereof.

"Dispersed polymer" means a colloidal dispersion of polymer particles in an aqueous carrier.

"Solubilized polymer" includes "Water soluble polymer", "Water reducible polymer" or a mixture thereof. Water soluble polymer means a polymer dissolved in water. Water reducible polymer means a polymer dissolved in water and water miscible solvent. Solubilized polymer results in a polymer solution characterized by having the self-crowding constant (K) of the Mooney equation $[1/\ln_{\eta_{rel}} = 1/BC - K/2.5]$ equal to zero. By contrast, dispersed polymer has (K) equal to 1.9. The details of Mooney equation are disclosed in an article entitled "Physical Characterization of Water Dispersed and Soluble Acrylic Polymers" by Brendley et al., in "Nonpolluting Coatings and Coating Processes" published by Plenum Press, 1973 and edited by Gordon and Prane.

"Polymer particle size" means the diameter of the polymer particles measured by using a Brookhaven Model BI-90 Particle Sizer supplied by Brookhaven Instruments Corporation, Holtsville, N.Y., which employs a quasi-elastic light scattering technique to measure the size of the polymer particles. The intensity of the scattering is a function of particle size. The diameter based on an intensity weighted average is used. This technique is described in Chapter 3, pages 48–61, entitled *Uses and Abuses of Photon Correlation Spectroscopy in Particle Sizing* by Weiner et al. in 1987 edition of American Chemical Society Symposium series. To measure the particle diameter, 0.1 to 0.2 grams of a sample of acrylic polymer was diluted to a total of 40 ml with distilled water. A two ml portion was delivered into an acrylic cell, which was then capped. The particle size in nanometers was measured for 1000 cycles. The measurement was repeated three times and an average was reported.

"Coalescence" means process by which discrete polymer particles in a dispersed polymer fuse together to form a film upon evaporation of water from the dispersed polymer.

"Coalescent" is a chemical material, which when added to dispersion polymer lowers the temperature at which coalescence would occur in absence of said coalescent.

The first step of the preferred method of the present invention directed to producing a sealer coating on the surface of a CS includes foaming an efflorescence resistant coating composition. The coating composition is typically foamed to a foam density in the range of from 0.04 to 0.25, preferably from 0.06 to 0.15 grams per milliliters. The foam density is controlled by adjusting the ratio of the latex binder to a non-reacting gaseous foam conveying medium, such as air, nitrogen, helium or carbon dioxide. Air is preferred. The foamed coating composition is typically provided with a viscosity in the range of 25 to 1200 centipoise (cps), preferably in the range of 50 to 800 cps. The viscosity is controlled by adjusting the amount of water present in the coating composition, by the addition of suitable rheology modifiers, such as, RM-825® rheology modifier supplied by Rohm and Haas Company, Philadelphia, Pa. to the coating composition, or by doing both. The coating composition having viscosities in excess of the upper limit of 1200 cps, are generally difficult to foam and those with viscosities of less than 25 cps are generally difficult to maintain in a foamed state.

Conventional foaming devices, such as, the Texacote Foamer, supplied by Textile Rubber and Chemical Co., Dalton, Ga. are suitable since such devices utilize air or gas whipping action to produce a foam of fine uniform bubble structure. Suitable gases include nonreactive gases, such as, carbon dioxide and nitrogen. Foam produced by air whipping is preferred. The foaming step is preferably carried out at room temperature.

The coating composition used in the foaming step of the preferred method of the present invention generally includes from 5 percent to 65 percent, preferably from 10 percent to 55 percent and most preferably from 15 percent to 45 percent of a latex binder, all in weight percentages based on the total weight of coating composition. The latex binder, which is stabilized, is provided with a Tg in the range varying from −20° C. to 100° C., preferably in the range varying from 0° C. to 70° C., a GPC weight average molecular weight ranging from 500 to 5,000,000, more preferably 1,000 to over 1,000,000, and most preferably ranging from 30,000 to 1,000,000. Anionically stabilized latex binders are preferred.

The latex binder of the composition may be a dispersed polymer having its particles dispersed in an aqueous evaporable carrier or it may either be a water soluble polymer, a water-reducible polymer, or a mixture thereof in the aqueous evaporable carrier. If desired the latex binder may include a mixture of a dispersed polymer with a water soluble or a water-reducible polymer. The dispersed polymer having particles with a particle size in the range of 20 to 1000 nanometers, preferably in the range of 30 to 500 nanometers, is preferred. The aqueous evaporable carrier includes water or water having dissolved therein a low VOC water miscible organic solvent, such as, methanol, ethanol and glycol ethers. Water is preferred.

The latex binder is polymerized from at least one or more of the following monomers, such as, for example, acrylic and methacrylic ester monomers including methyl (meth)acrylate, ethyl (meth)acrylate, butyl (meth)acrylate, 2-ethylhexyl (meth)acrylate, decyl (meth)acrylate, lauryl (meth)acrylate, isobornyl (meth)acrylate, isodecyl (meth) acrylate, oleyl (meth)acrylate, palmityl (meth)acrylate, stearyl (meth)acrylate, hydroxyethyl (meth)acrylate, and hydroxypropyl (meth)acrylate; acid functional monomers, such as, acrylic acid, methacrylic acid, crotonic acid, itaconic acid, fumaric acid and maleic acid; monomethyl itaconate; monomethyl fumarate; monobutyl fumarate; maleic anhydride; acrylamide or substituted acrylamides; diacetone acrylamide; glycidyl methacrylate; acetoacetyl ethylmethacrylate; acrolein and methacrolein; dicyclopentadienyl methacrylate; dimethyl meta-isopropenyl benzyl isocyanate; isocyanato ethylmethacrylate; styrene or substituted styrenes; butadiene; ethylene; vinyl acetate or other vinyl esters; vinyl monomers, such as, for example, vinyl halide, preferably vinyl chloride, vinylidene halide, preferably vinylidene chloride, N-vinyl pyrrolidone; amino monomers, such as, for example, N,N'-dimethylamino (meth)acrylate and acrylonitrile or methacrylonitrile. At least one of the monomers utilized in the preparation of the latex binder, provides for a reactive pendant functional moiety, such as, an acid functional, amine functional, alcohol functional pendant moieties.

In order to improve the emulsion stability, the latex binder generally includes an acid functional pendant moiety sufficient to provide the latex binder with an acid number in the range of from 0.8 to 390, preferably in the range of from 0.8 to 80. The desired acid number is achieved by controlling the amount of acid functional monomer utilized in producing the latex binder. The desired range of the acid number is obtained by utilizing the latex binder containing an acid functional monomer, such as, phosphoethyl methacrylate monomer or ethylenically-unsaturated carboxylic acid monomers, such as, acrylic acid, fumaric acid-monoethyl ester, fumaric acid, itaconic acid, maleic acid, maleic anhydride, methacrylic acid, fumaric acid-monomethyl ester, methyl hydrogen maleate, 2-acrylamido-2-methylpropane sulfonic acid, sodium vinyl sulfonate, sulfoethyl methacrylate, or combinations thereof. Preferred ethylenically-unsaturated carboxylic acid monomer is selected from the group consisting of acrylic acid, methacrylic acid, and combinations thereof.

The latex binder polymerized from monomeric mixtures that include the following monomer combination is more preferred:

1) butyl acrylate, methyl methacrylate,
2) butyl acrylate, styrene,
3) 2-ethyl hexyl acrylate with methyl methacrylate, and
4) 2-ethyl hexyl acrylate with styrene.

These monomeric mixtures typically include acrylic or methacrylic acid to further enhance emulsion stability.

The latex binder used in this invention is a substantially thermoplastic or substantially uncrosslinked copolymer when applied to the substrate. If desired, premature crosslinking or gelling of the copolymer is induced by adding to the monomer mix multi-ethylenically unsaturated monomers in the range of 0.1% to 25%, by weight based on the weight of the copolymer. Typical multi-ethylenically unsaturated monomers include allyl methacrylate, diallyl phthalate, 1,4-butylene glycol dimethacrylate, 1,6-hexanedioldiacrylate and divinyl benzene. It is important, however, that the quality of the film formation is not materially impaired.

The polymerization techniques used for preparing the anionically stabilized latex binder of the present invention are well known in the art. The latex binder may be prepared by aqueous solution polymerization or emulsion polymerization. Emulsion polymerization is preferred. Either thermal or redox initiation processes may be used.

The polymerization process is typically initiated by conventional free radical initiators, such as, for example, hydrogen peroxide, benzoyl peroxide, t-butyl hydroperoxide, t-butyl peroctoate, ammonium and alkali persulfates, typically at a level of 0.05 percent to 3.0 percent by weight, all weight percentages based on the weight of total monomer. Redox systems using the same initiators coupled with a suitable reductant such as, for example, isoascorbic acid and sodium bisulfite may be used at similar levels.

Chain transfer agents may be used in an amount effective to provide a GPC weight average molecular weight of 500 to 5,000,000. For purposes of regulating molecular weight of the latex binder being formed, suitable chain transfer agents include well known halo-organic compounds, such as, carbon tetrabromide and dibromodichloromethane; sulfur-containing compounds, such as, alkylthiols including ethanethiol, butanethiol, tert-butyl and ethyl mercaptoacetate, as well as aromatic thiols; or various other organic compounds having hydrogen atoms which are readily abstracted by free radicals during polymerization. Additional suitable chain transfer agents or ingredients include but are not limited to butyl mercaptopropionate; isooctyl mercaptopropionic acid; isooctylmercapto propionate ("IOMP"); bromoform; bromotrichloromethane ("BTCM"); carbon tetrachloride; alkyl mercaptans, such as, 1-dodecanthiol, tertiary-dodecyl mercaptan, octyl mercaptan, tetradecyl mercaptan, and hexadecyl mercaptan; alkyl thioglycolates, such as, butyl thioglycolate, isooctyl thioglycoate, dodecyl thioglycolate; thioesters; or combinations thereof. Mercaptans are preferred.

When the latex binder in the form a dispersed polymer is utilized, the diameter of the polymer particles is controlled by the amount of conventional surfactants added during the emulsion polymerization process. Conventional surfactants include anionic, nonionic emulsifiers or their combination. Typical anionic emulsifiers include alkali or ammonium alkyl sulfates, alkyl sulfonic acids, alkyl phosphonic acids, fatty acids, and oxyethylated alkyl phenol sulfates and phosphates. Typical nonionic emulsifiers include alkylphenol ethoxylates, polyoxyethylenated alkyl alcohols, amine polyglycol condensates, modified polyethoxy adducts, long chain carboxylic acid esters, modified terminated alkylaryl ether, and alkylpolyether alcohols.

Alternatively, the latex binder may include multi-stage polymer particles having two or more phases of various geometric structures, such as, for example, core/shell or core/sheath particles, core/shell particles with shell phases incompletely encapsulating the core, core/shell particles with a multiplicity of cores and interpenetrating network particles. In all of these cases the majority of the surface area of the particle will be occupied by at least one outer phase and the interior of the latex polymer particle will be occupied by at least one inner phase. The outer phase of the multi-stage polymer particles weighs 5 weight percent to 95 weight percent based on the total weight of the particle. A GPC weight average molecular weight of these multi-stage polymer particles is in the range of from 500 to 5,000,000, preferably from 1000 to 1,000,000.

The multi-stage polymer particles are prepared by conventional emulsion polymerization process in which at least two stages differing in composition are formed in a sequential fashion. Such a process usually results in the formation of at least two polymer compositions. Each of the stages of the multi-stage polymer particles may contain the same monomers, chain transfer agents, surfactants, as those disclosed earlier for the polymer particles. The emulsion polymerization techniques used for preparing such multi-stage polymer particles are well known in the art and are disclosed, for example, in the U.S. Pat. Nos. 4,325,856, 4,654,397 and 4,814,373.

The latex binder in the form of a water-reducible polymer or water-soluble polymer may be prepared directly in water if the monomer mix is water-soluble or, as is most often the case, the polymerization solvent is a water-miscible solvent, such as, isopropanol, butyl cellosolve, propylene glycol, or mixtures thereof. In such a case, water may be included in the polymerization mixture or post added after the polymerization is complete. Such polymers may be prepared by utilizing the monomers described earlier. Another route to preparation of a water-soluble polymer for this invention is to prepare a latex polymer having enough acrylic or methacrylic acid or other polymerizable acid monomer (usually greater than 10 percent) such that the latex polymer can be solubilized by the addition of ammonia or other base dissolved in water. Water-soluble polymers of this type are advantageously used as blends with the dispersed polymers.

The coating composition further contains from 1 to 15 percent, preferably from 2 to 8 percent, by weight of the emulsion solids of a foaming agent. Some of the suitable foaming agents include alkali metal, ammonium and amine salts of fatty acids, such as, aliphatic or mixtures of aliphatic carboxylic acids, or the mixtures thereof. Examples of preferred aliphatic carboxylic acids include stearic acid, tallow fatty acids and oleic acid. Particularly preferred are salts, such as, alkyl sulfates, or soaps or salts of stearic acid, or of partially or fully hydrogenated fatty acids of natural origin containing stearic acid, such as, hydrogenated tallow acid, hydrogenated tall oil fatty acids, hydrogenated soy bean oil fatty acids, and hydrogenated tung acids. More preferred water-soluble salts or soaps of these acids are the alkali metal, usually sodium or potassium salt, the ammonium salts and the amine salts, such as, alkanolamine salts, e.g., mono-, di- and triethanolamine salts. Ammonium lauryl sulfate is most preferred.

If the amount of either the foaming agent added to the emulsion exceeds 15 percent by weight of the emulsion, the water sensitivity of the resultant coating is adversely affected.

Figure 1B:
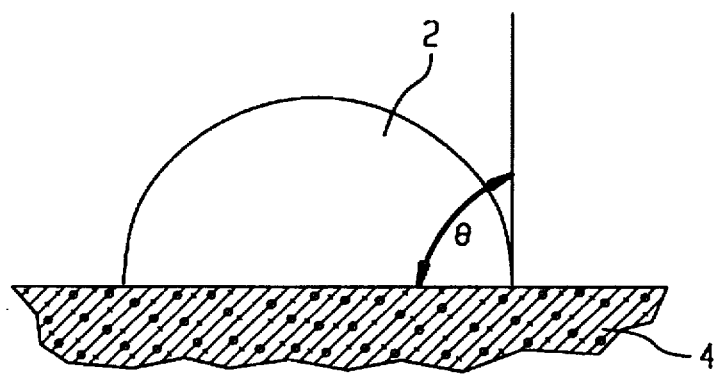
Figure 1C:
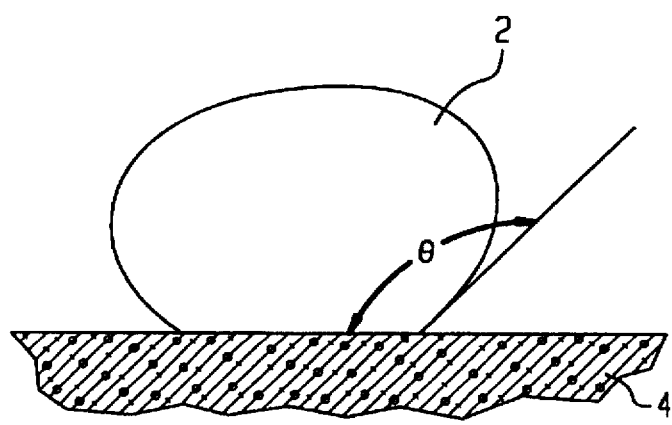

If desired, the latex binder further includes from 0 to 10 percent, preferably from 0.1 to 10, and more preferably from 2 to 5 percent, by weight of the emulsion solids, of a wetting agent, such as, for example, $C_{12}$ to $C_{18}$ primary, secondary and tertiary amines and salts thereof, diamines, polyamines and their salts, quaternary ammonium salts, polyoxyethylenate amines, quaternized polyoxyethylenate amines or amine oxides. The purpose of the wetting agent is to reduce the surface tension of the foamed layer of the latex binder and thereby enhance surface contact between the foamed layer and the CS surface on which it is deposited. Such a reduction in the surface tension of the foamed layer of the latex binder results in uniform and substantially complete contacting of the foamed layer to the underlying CS surface. The degree of wetting of the surface can be illustrated by a contact angle ($\theta$), shown in FIGS. 1A, 1B and 1C, which is an interfacial angle formed between a CS surface 2 (solid phase) and a drop of a foamed layer 4 (foamed phase) placed thereon. A theoretical contact angle $\theta$ of 180° indicates no wetting between the solid and liquid phases and a theoretical contact angle $\theta$ of 0° indicates complete wetting between the solid and liquid phases. The wide angle $\theta$, as shown in FIG. 1-C, represents a foamed layer 4 having higher surface tension that results in reduced wetting of CS surface 2 by foamed layer 4. The acute angle $\theta$, as shown in FIG. 1-A, represents a foamed layer 4 having lower surface tension that results in decreased wetting of CS surface 2 by foamed layer 4. The desired degree of wetting action by the wetting agent in the composition of the present invention occurs when the wetting angle varies from 10° to 110°, preferably from 20° to 80°.

If desired, the latex binder further includes from 0 to 30 percent, preferably from 2 to 15, and more preferably from 3 to 10 percent, by weight of the binder solids of a coalescent, such as, for example, monoalkyl and monoaryl ethers of ethylene glycol; diethylene glycol; propylene glycol; dipropylene glycol, such as, monobutyl ether of ethylene glycol, monobutyl ether of dipropylene glycol and monophenyl ether of ethylene glycol; carboxylic acid esters of the above described glycols and diglycols, such as, acetate ester of ethylene glycol monobutyl ether. Monoisobutyrate ester of 2,2,4-trimethylpentane 1,3-diol supplied by Eastman Chemicals, Inc., Kingsport, Tenn., under the trade name known as, Texanol®monoisobutyrate ester is preferred. It is believed, without reliance thereon, that the presence of coalescent in the composition of the present invention further improves film formation, thereby providing a barrier to substantial migration of moisture from within CS to atmosphere. As a result, formation of efflorescence on the CS surface is further inhibited. Moreover, by delaying the migration of moisture from within CS to atmosphere, hydration of CS, if it is in its wet state, is further extended thereby improving the structural strength of the resulting CS.

If desired, the latex binder further includes from 0.1 to 2 percent, preferably from 0.2 to 0.8 percent, by weight of the emulsion solids of a homogenizing agent. Suitable homogenizing agents include non-ionic surfactants, such as, preferably, TRITON® X-405 octyl phenoxy polyethoxy ethanol supplied by Union Carbide Co., Charleston, W. Va. The purpose of the homogenizing agent is to enhance the uniform and homogeneous dispersion of the various components of the latex binder, especially for attaining uniform color dispersion of a pigmented latex binder. Furthermore, the presence of the homogenizing agent in the composition improves in formation of a foamed layer having substantially uniform cell size.

Depending upon the intended use of the sealer coating, additional components may be added to the composition. These additional components include but are not limited to pigments, pigment extenders, plasticizers, cosolvents, coalescing agents, fungicide, rheology modifiers, fillers, such as, talc, preservatives, and freeze/thaw protectors.

The next step of the preferred method of the present invention is directed to applying a layer of a desired thickness of the foamed composition on the surface or edge of a wet CS by conventional means, such as, a curtain coater, spray nozzle, roller coater, flow coater or by extrusion, which is particularly useful for coating edges. The foamed layer may be uniformly leveled to a desired thickness by conventional leveling means, such as, a doctor blade, to meet the desired requirements of the resultant coating, such as, a sealer coating. Foamed layer generally in the range of 0.8 mm to 10 mm, preferably in the range of 2 to 5 mm is desirable. The present invention contemplates applying the foamed layer on more than one surface of CS, such as, front and back or along the edges of a substantially planar CS or on the surface of a contoured CS, such as, a molding or molded roof tile. It is further contemplated that the foamed layer may be applied on a continuously moving CS or on a precut CS.

The next step of the preferred method of the present invention is directed to collapsing the foamed layer on the surface of the wet CS. The foamed layer generally collapses by it self within a collapsing time of less than 20 minutes, preferably within from 3 seconds to 15 minutes, more preferably within from 10 seconds to 5 minutes. If the foamed layer does not collapse within 20 minutes, it is believed without reliance thereon, that a substantial portion of the cement constituents may migrate to the CS surface to produce an efflorescent layer thereon. If desired, the collapsing of the foamed layer on CS may be accelerated by heating, blowing an air stream, or by subjecting CS with the foamed layer thereon to ultrasonic vibrations.

The next step of the preferred method of the present invention is directed to hydrating the wet CS having the collapsed foamed layer thereon. The process of hydration time dependent and generally lasts for up to 28 days at which point, CS attains most of its structural strength. The time of hydration may be adjusted, if need be, by varying the humidity and by subjecting CS to elevated temperatures. By way of example, CS in the roof tile is generally hydrated within from 5 to 15 hours to up to 24 hours.

If desired, the method of the present invention further includes adding additional clear or pigmented layers on top of the sealer coating applied by the method of the present invention. For example, a layer of conventional latex binder typically used for producing high gloss, extended weatherability or additional protection from efflorescence, may be added on top of the sealer coating applied in accordance with the method of the present invention.

It is further contemplated that the method of the present invention includes producing an efflorescent resistant coating on a green or hydrated CS.

The method of the present invention produces a cementitious substrate having a smooth surface suitable as a durable sealer coating on the surfaces, including the edges, of roof tiles, slates or caves; building products, such as, interior and exterior sidings and concrete floor tiles. It is contemplated that depending upon the use desired, one of ordinary skill in the art would vary the thickness of the coating by varying the thickness of the foamed layer or by varying the solids content of the compostion in the foamed layer. For example, the coating of the present invention may be also be used to prevent water penetration of cementitious substrates, such as, roof tiles that are exposed to rainy weather conditions. If desired the composition may be provided with a pigment, such as, iron oxide, to produce sealer coating that does not require additional pigmented finish coats or stains on cementitious substrates.

TESTING PROCEDURES

The following test procedures were used for evaluating the data reported in the Examples below:

Foam Size Distribution:

The uniformity of the foam cells of the foamed layer of the coating composition is visually observed in determining its uniformity. By way of illustration, FIG. 2-A illustrates a uniformly foamed layer containing uniform foam cells identified by Arab numeral 2 having substantially uniform cell size and shape. By contrast, FIG. 2-B illustrates a foamed layer containing large foam cells 6 intermixed with uniform foam cells 4. A foamed layer containing large foam cells 6 having at least four times the size of uniform foam cells 4 is not desirable and is not considered to be uniformly sized. However, a foamed layer containing large foam cells 6 not more than four times, preferably not more than three times, more preferably not more than twice the size of foam cells 4, is desirable and is considered to be uniformly sized.

Degree of Efflorescence:

The degree of efflorescence is measured visually on the efflorescence scale of 0 to 10, whereby number 10 represents a CS surface having no efflorescence and 0 represents a CS surface having total efflorescence. Numbers 5 and above on the efflorescence scale are considered acceptable for the determining the acceptable degree of efflorescence on CS under this test. By way of illustration, FIGS. 3-A and 4-A represent an efflorescence free CS surface designated as number 10 on the efflorescence scale. FIGS. 3-C and 4-C represent a CS surface with an acceptable degree of efflorescence designated as numbers 8 and 5 on the efflorescence scale, respectively, and FIGS. 3-B and 4-B represent a CS surface with unacceptable degree of efflorescence designated as numbers 2 and 1 on the efflorescence scale, respectively.

Preparation of Polymer 1

A stirred reaction kettle containing 914 grams of deionized water was heated under nitrogen atmosphere to 85° C. To the heated kettle, 15.5 grams of sodium lauryl sulfate, 7.6 grams of sodium carbonate, and 7.8 grams of sodium persulfate were added. A monomer emulsion mixture was prepared by mixing 869 grams of deionized water with 15.5 grams of sodium lauryl sulfate, 992 grams of butyl acrylate, 1155 grams of methyl methacrylate, and 28.3 grams of methacrylic acid. Portions of the monomer emulsion mixture (180 grams) was then added to the heated kettle. The remainder of the monomer emulsion mixture was then gradually added to the reaction kettle, followed by 50 grams of deionized water. The reaction kettle was then cooled and 0.01 grams of ferrous sulfate dissolved in 1 gram of deionized water was added, followed by a total of 1.76 grams of tertiary butylhydrogen peroxide dissolved in 40 grams of deionized water and 0.88 grams of sodium sufoxylate formaldehyde dissolved in 30 grams of deionized water. Following this addition, 50 grams of aqueous ammonia was added.

The final latex had a particle size of 180 nm, a solids content of 52.5% by weight, a pH of 9.9, Tg of 26° C. and a viscosity of less than 250 centipoise (measured by using Brookfield viscometer with a No. 2 spindle running @30 RPM).

Examples 1–4

Examples 1 through 4, shown in Table 1 below, were prepared by adding the components in the order shown in Table 1 to evaluate the effect of wetting agents and coalescents on the uniformity of foam distribution.

TABLE 1

| Examples | 1* | 2* | 3* | 4* |
|---|---|---|---|---|
| Polymer 1 | 100 | 100 | 100 | 100 |
| coalescent[1] | 5 | 5 | 5 | 5 |
| wetting agent[2] | 0 | 1 | 2 | 3 |
| Solids content in weight % | 47.6 | 47.2 | 46.7 | 46.3 |

Unless stated otherwise, the following commercial components were used:
[1]Texanol ® Coalescent supplied by Eastman Chemical Products, Inc., Kingsport, Tennessee.
[2]Triton ® GR-5M surfactant supplied by Union Carbide Corporation, Danbury, Connecticut.
*in grams.

One hundred grams of each of the compositions of Examples 1–4 were foamed in a Kitchen Aid® blender for 10 minutes at high speed followed by 5 minutes at medium speed. The resulting foam was applied over a CS test surface prepared from a fiber cement board supplied by Eternit Company, Leiman, Germany. A doctor blade known as Gardner Knife-Series 161, supplied by Gardner Laboratories, Bethesda, Md., was used to control the foamed layer to a thickness of 2.4 mms. The properties of the foamed layer are illustrated in Table 2 below:

TABLE 2

| Examples | 1 | 2 | 3 | 4 |
|---|---|---|---|---|
| Foam Density (gm/mL) | 0.13 | 0.12 | 0.07 | 0.06 |
| Foam Distribution | not uniform* | not uniform | uniform** | uniform** |

*similar to that shown in FIG. 2-B;
**similar to that shown in FIG. 2-A.

Examples 1–4 indicates that by increasing the amount of a wetting agent in the composition, the uniformity of the foam distribution of the resulting foamed layer is improved while lowering its foam density.

Examples 5–8

Examples 5 through 8, shown in Table 3 below, were prepared, foamed and applied over the test CS surface in accordance with the procedure described in Examples 1–4:

TABLE 3

| Examples | 5* | 6* | 7* | 8* |
|---|---|---|---|---|
| Polymer 1 | 100 | 100 | 100 | 100 |
| coalescent[1] | 5 | 5 | 5 | 5 |

TABLE 3-continued

| Examples | 5* | 6* | 7* | 8* |
|---|---|---|---|---|
| wetting agent[2] | 2 | 2 | 2 | 2 |
| foaming agent[3] | 0 | 1 | 2 | 3 |
| Solids content in weight % | 48.0 | 47.8 | 47.6 | 47.4 |

Unless stated otherwise, the following commercial components were used:
[1]Texanol ® Coalescent supplied by Eastman Chemical Products, Inc., Kingsport, Tennessee.
[2]Triton ® GR-5M surfactant supplied by Union Carbide Corporation, Danbury, Connecticut.
[3]Rhodapon ® L-22 ammonium lauryl sulfate supplied by Rhone-Poulenc Corporation, Cranberry, New Jersey.
*in grams.

The properties of the foamed layers of Examples 5–8 prepared and shown in Table 4 as follows:

TABLE 4

| Examples | 5 | 6 | 7 | 8 |
|---|---|---|---|---|
| Foam Density (gm/mL) | 0.065 | 0.062 | 0.059 | 0.049 |
| Foam Distribution | uniform** | uniform** | uniform** | uniform** |

**similar to that shown in FIG. 2-A.

Examples 5–8 indicate that by increasing the amount of a foaming agent added to the composition, the foam density can be reduced while producing a foamed layer having uniform foam distribution.

Examples 9–11

Examples 9 through 11, shown in Table 5 below, were prepared, foamed and applied over the test CS surface in accordance with the procedure described in Examples 1–4:

TABLE 5

| Examples | 9* | 10* | 11* |
|---|---|---|---|
| Polymer 1 | 100 | 100 | 100 |
| coalescent[1] | 5 | 5 | 5 |
| wetting agent[2] | 2 | 2 | 2 |
| foaming agent[3] | 2 | 2 | 2 |
| Solids content in weight % | 47.6 | 30.0 | 26.1 |

Unless stated otherwise, the following commercial components were used:
[1]Texanol ® Coalescent supplied by Eastman Chemical Products, Inc., Kingsport, Tennessee.
[2]Triton ® GR-5M surfactant supplied by Union Carbide Corporation, Danbury, Connecticut.
[3]Rhodapon ® L-22 ammonium lauryl sulfate supplied by Rhone-Poulenc Corporation, Cranberry, New Jersey.
*in grams.

The properties of the foamed layers of Examples 9–11 are shown in Table 6 below:

TABLE 6

| Examples | 9 | 10 | 7 | 11 |
|---|---|---|---|---|
| Foam Density (gm/mL) | 0.059 | 0.04 | | 0.039 |
| Foam Distribution | uniform** | uniform** | | uniform** |

**similar to that shown in FIG. 2-A.

Examples 10 and 11 with lower foam densities and solids content not only provide uniform foam distribution, but are also, due to their low foam densities and solids content, easier to foam than Example 9 having higher solids content.

Preparation of Concrete Mix Test Substrates 676.6 grams of Type I Portland cement, supplied by MDC, Philadelphia, Pa., was added to the mixing bowl of a Hobart mixer along with 2029.7 grams of 45 mesh sand, supplied by Morie Company, Milleville, N.J. The mixture was stirred until well mixed. 33.8 grams of Bayferrox® 318M black iron oxide, supplied by Mobay Corporation, Pittsburgh, Pa. was then added to the mixture with stirring. 341.3 grams of deionized water was slowly poured into the bowl as the mixture was being stirred, which was continued until a thoroughly mixed concrete mix was prepared. The concrete mix was poured into a Petrie dish (to be referred to as a patty-A) and the top surface was smoothed with a spatula to create as flat a surface as possible. Illustrative example of patty-A is shown in FIG. 3-A.

Preparation of Slurried Test Substrates 49.35 grams of Bayferrox® 318M black iron oxide, supplied by Mobay Corporation, Pittsburgh, Pa. was added with moderate stirring to 459.3 grams of deionized water contained in the bowl of Fisher Scientific lab stirrer model SL 2400. Approximately after two minutes, when the Bayferrox® 318M black iron oxide was completely wet, 987 grams of Type I Portland cement, supplied by MDC, Philadelphia, Pa., was slowly added under continuos stirring to the mixture until the mixture was thoroughly mixed. 493.5 grams of 45 mesh sand, supplied by Morie Company, Milliville, N.J. was then added with good agitation until the sand was thoroughly mixed in the mixture to form a cementitious slurry. The slurry was poured into a Petrie dish (to be referred to as patty-B) and the top surface was smoothed with a spatula to create as flat a surface as possible. Illustrative example of patty-B is shown in FIG. 4-A.

Examples 12–13

Examples 12 and 13, shown in Table 7 below, were prepared in accordance with the procedure described in Examples 1–4:

TABLE 7

| Example | 12* | 13* |
|---|---|---|
| Polymer 1 (50% solids) | 95.24 | 565.56 |
| coalescent[1] | 4.76 | — |
| coalescent[2] | — | 33.0 |
| foaming agent[3] | 4.0 | — |
| wetting agent[4] | 4.0 | — |
| defoamer[5] | — | 0.72 |
| surfactant[6] | — | 0.72 |
| water | 100.0 | 106.95 |
| Total | 210.0 | 706.95 |

Unless stated otherwise, the following commercial components were used:
[1]Texanol ® Coalescent supplied by Eastman Chemical Products, Inc., Kingsport, Tennessee.
[2]butyl cellosolve @ 60.0% solids.
[3]Rhodapon ® L-22 ammonium lauryl sulfate supplied by Rhone-Poulenc Corporation, Cranberry, New Jersey.
[4]Triton ® GR-5M surfactant supplied by Union Carbide Corporation, Danbury, Connecticut.
[5]Drew ® Y defoamer, supplied by Drew Industrial Division, Ashland Chemical Co., Boonton, New Jersey.
[6]Surfynol ® 104 E surfactant, supplied by Air Products and Chemicals, Inc., Allentown, Pennsylvania.
*parts by weight.

Example 12 was foamed and applied over the surfaces of one set of Patties-A and -B in accordance with the procedure described in Examples 1–4. Unfoamed version of the composition of Examples 12 and 13 was sprayed as a clear layer of 0.0254 mm thickness on another set of Patties-A and -B.

All the patties were then immediately placed into a humidity chamber set to 60° C. and 95% relative humidity for 16 hours. The patties were then taken out and visually analyzed for the degree of efflorescence present on these patties. The results are described below in Table 8:

TABLE 8

| Application | Example | Solids | Dry grams per sq. ft | Substrate | Degree of Efflorescence |
|---|---|---|---|---|---|
| Foamed | 12 | 22.7 | 1.1* | Patty-B | 5 |
| Sprayed | 12 | 22.7 | 1.3 | Patty-B | 1 |
| Sprayed | 13 | 40.0 | 2.0 | Patty-B | 3 |
| Foamed | 12 | 22.7 | 1.1 | Patty-A | 8 |
| Sprayed | 12 | 22.7 | 1.3 | Patty-A | 4 |
| Sprayed | 13 | 40.0 | 2.0 | Patty-A | 2 |

Efflorescence rated 1 to 10, 1 = severe, 10 = none
*Estimated.

Table 8, shows applicants' unexpected discovery, that a foamed sealer composition substantially reduces efflorescence on a CS surface when compared to the same composition in an unfoamed state.

What is claimed is:

1. A method of producing an efflorescence resistant coating on a cementitious substrate comprising:
    foaming an efflorescence resistant coating composition comprising an aqueous evaporable carrier containing a latex binder having a Tg in range varying from −20° C. to 100° C., a weight average molecular weight in the range varying from 500 to 5,000,000, and a foaming agent selected from the group consisting of alkali metal, ammonium and amine salts of $C_{12}$–$C_{24}$ aliphatic carboxylic acids, and mixtures thereof;
    applying a foamed layer of said efflorescence resistant coating composition on the surface of said cementitious substrate;
    collapsing said foamed layer on said surface of said cementitious substrate to form said efflorescence resistant coating thereon.

2. The method of claim 1 wherein said cementitious substrate is wet, green or hydrated.

3. The method of claim 2 further comprising hydrating said green or wet cementitious substrate after said collapsing step.

4. The method of claim 1 further comprising improving wetting of said surface of said cementitious substrate by adding a Wwetting agent to said composition, said wetting agent being selected from the group consisting of a cationic, anionic, nonionic surfactant wetting agent and mixtures thereof.

5. The method of claim 1 further comprising improving film formation of said collapsed foamed layer by adding a coalescent.

6. The method of claim 1 wherein said efflorescence resistant coating composition comprises 1 percent to 15 percent by composition solids of said foaming agent.

7. The method of claim 1 wherein said efflorescence resistant coating composition further comprising a pigment.

8. A cementitious substrate having an efflorescence resistant coating thereon produced in accordance with the method of claim 1 or 7.

9. A method of producing an efflorescence resistant coating on a cementitious substrate comprising:
    foaming an efflorescence resistant coating composition comprising an aqueous evaporable carrier containing a latex binder having a Tg in range varying from −20° C. to 100° C., a weight average molecular weight in the range varying from 500 to 5,000,000; a foaming agent; a coalescent; and a wetting agent in the range of from 0.1 weight percent to 10 weight percent based on emulsion solids for reducing surface tension;

applying a foamed layer of said efflorescence resistant coating composition on the surface of a wet cementitious substrate without physically disturbing said surface, said wetting agent in said composition enhancing surface contact between said foamed layer and said surface;

collapsing said foamed layer on said surface of said wet cementitious substrate; and hydrating said wet cementitious substrate having said efflorescence resistant coating thereon.

10. The method of claim 9 wherein said collapsed foamed layer of said composition extends the hydrating time of said wet cementitious substrate by preventing release of moisture from within said wet cementitious substrate.

11. A method of producing an efflorescence resistant coating comprising:

foaming an efflorescence resistant coating composition into a foam having substantially uniform cell size, said composition comprising an aqueous evaporable carrier containing a latex binder having a Tg in range varying from −20° C. to 100° C., a weight average molecular weight in the range varying from 500 to 5,000,000; a foaming agent; a coalescent; a homogenizing agent and a wetting agent;

uniformly distributing on the surface of a wet or green cementitious substrate, a foamed layer of said efflorescence resistant coating composition to substantially contact said surface without physically disturbing said surface;

collapsing said layer on said surface to form said efflorescence resistant coating thereon; and hydrating said wet or green cementitious substrate.

12. A method of producing an efflorescence resistant coating comprising:

foaming an efflorescence resistant coating composition into a foam having substantially uniform cell size, said composition comprising an aqueous evaporable carrier containing a latex binder having a Tg in range varying from −20° C. to 100° C., a weight average molecular weight in the range varying from 500 to 5,000,000; a foaming agent selected from the group consisting of alkali metal, ammonium and amine salts of $C_{12}$-$C_{24}$ aliphatic carboxylic acids, and mixtures thereof; a coalescent; a homogenizing agent and a wetting agent;

uniformly distributing on the surface of a hydrated cementitious substrate, a foamed layer of said efflorescence resistant coating composition to substantially contact the surface of said hydrated cementitious substrate; and collapsing said layer on said surface to form said efflorescence resistant coating thereon.

13. A method of producing an efflorescence resistant coating comprising:

foaming an efflorescence resistant coating composition into a foam having substantially uniform cell size, said composition comprising an aqueous evaporable carrier containing a latex binder having a Tg in range varying from −20° C. to 100° C., a weight average molecular weight in the range varying from 500 to 5,000,000; a foaming agent; a coalescent; a homogenizing agent and a wetting agent;

uniformly distributing on the surface of a slurry, a foamed layer said efflorescence resistant coating composition to substantially contact said surface without physically disturbing said surface;

collapsing said layer on said surface to form said efflorescence resistant coating thereon; and hydrating said slurry.

14. The method of any one of claims 9, 11, 12 or 13 wherein said efflorescence resistant coating composition includes from 2 percent to 15 percent of said coalescent, all in weight percentages based on the weight of binder solids.

15. A cementitious substrate having an efflorescence resistant coating thereon produced in accordance with the method of any one of claims 9, 11, 12 or 13.

16. The method of any one of claims 1, 9, 11, 12 or 13 wherein said efflorescence resistant coating composition has a viscosity in the range of from 25 to 1200 cps.

17. The method of any one of claims 1, 9, 11, 12 or 13 further comprising controlling the thickness of said foamed layer in the range of from 0.8 mm to 10 mm.

18. The method of any one of claims 1, 9, 11, 12 or 13 wherein said efflorescence resistant coating composition includes in the range of from 5 percent to 65 percent of said latex binder, all in weight percentages based on total composition weight.

19. The method of any one of claims 1, 9, 11, 12 or 13 wherein said efflorescence resistant coating composition is foamed to a foam density in the range of from 0.04 to 0.25 grams per milliliters.

20. The method of any one of claims 1, 9, 11, 12 or 13 wherein said foaming step is carried out at room temperature.

21. The method of any one of claims 1, 9, 11, 12 or 13 wherein said collapsing of said foam layer occurs in less than 20 minutes.

22. The method of any one of claims 1, 9, 11, 12 or 13 wherein said foamed layer is applied by extrusion.

* * * * *